April 26, 1949.   T. HAMILTON   2,468,627
TRAILER CASTER
Filed March 1, 1946
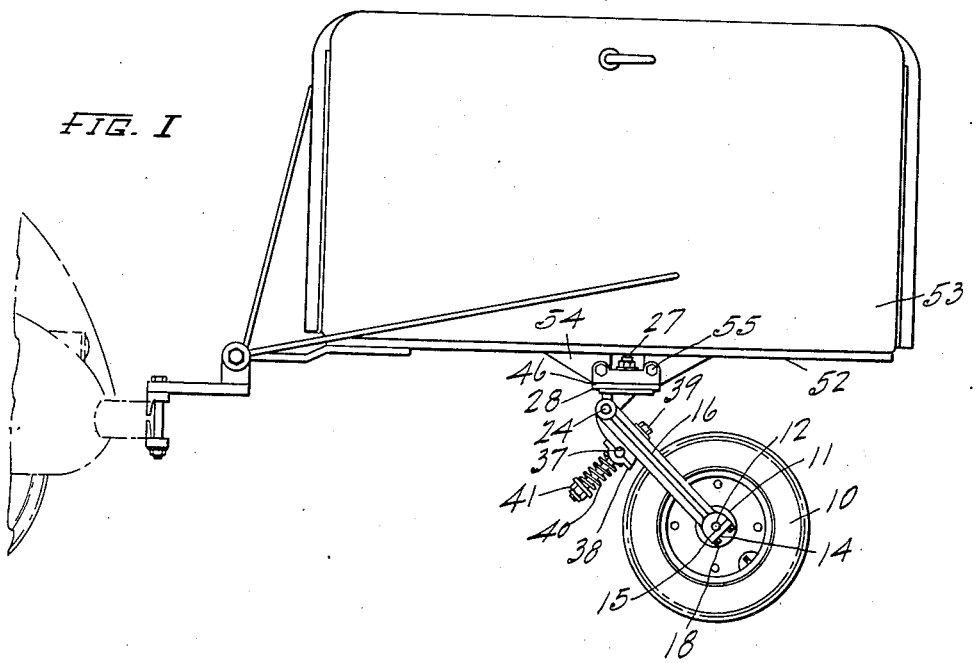
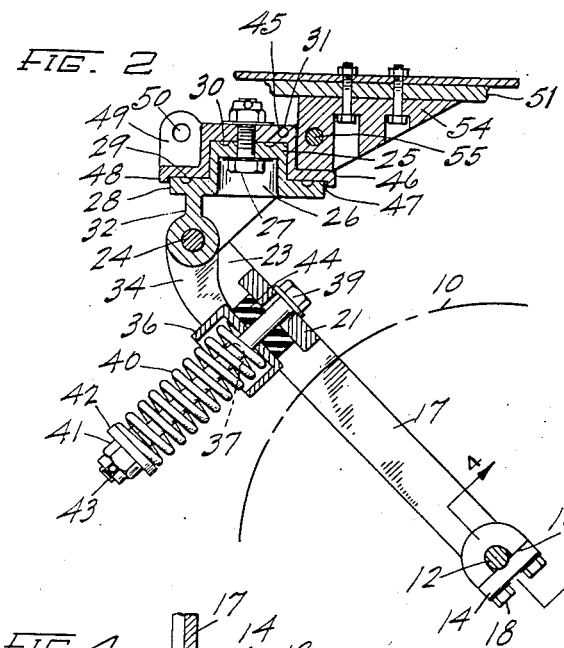
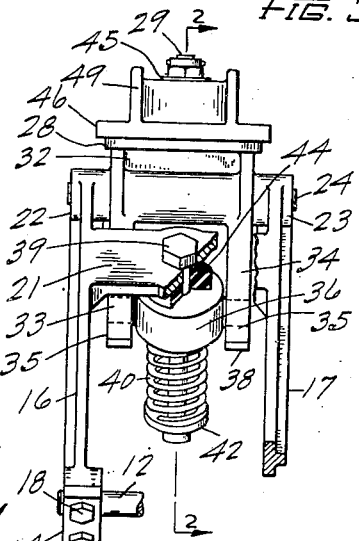
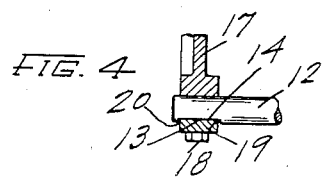
INVENTOR.
Tolbert Hamilton
BY
Philip A. Friedell
Attorney Patented Apr. 26, 1949

2,468,627

UNITED STATES PATENT OFFICE 2,468,627

TRAILER CASTER

Tolbert Hamilton, Oakland, Calif.

Application March 1, 1946, Serial No. 651,115

2 Claims. (Cl. 16—44)

This invention, a trailer caster, is an improvement over conventional casters because of the broad pivotal span of the rigid wheel fork, the rigidity of the spring fork, close coupling of the resilient means, and the rapidity and ease with which the wheel can be removed from the wheel fork without any disassembly of the wheel bearing or pivot.

The caster is very easily assembled and disassembled, easily attached to a vehicle, has an excellent pivot connection to the vehicle to provide for perfect tracking with freedom from swaying or wobbling, has an adjustable spring action so that the resiliency can be adjusted to best suit the load, and has a wheel axle connection which permits easy removal of the complete wheel structure including the axle without any disassembly.

The objects and advantages of the invention are as follows:

First, to provide a new and improved type of trailer caster.

Second, to provide a trailer caster with a rigid fork from which the road wheel can be removed easily without any disassembly of the wheel bearing structure including the axle.

Third, to provide a caster as outlined in which the wheel fork is of rigid construction and provided with a broad pivot bearing for stability.

Fourth, to provide a caster as outlined with an adjustable spring tension and a pivotal spring seat.

Fifth, to provide a caster as outlined with a swivel connection for the trailer in which a bracket is fixed to the bottom of the trailer with the swivel connection removably attached thereto for convenient replacement of the caster including its pivot, at will.

In describing the invention reference will be made to the accompanying drawings, in which:

Fig. 1 is a side elevation of a trailer showing the invention applied thereto.

Fig. 2 is a side sectional elevation of the invention, taken on line 2—2 of Fig. 3.

Fig. 3 is a rear elevation of the invention with a part broken away to show the bumper and spring arrangement.

Fig. 4 is a section taken on line 4—4 of Fig. 2.

The conventional caster wheel 10 has a wheel bearing unit 11 which includes an axle 12 on which the wheel bearing rotates, the axle on conventional casters being usually secured by adjustable clamp elements such as nuts which must be removed and the axle drawn through the axle passage, while in my invention the axle is provided with a flat 13 at each end as indicated in Fig. 4, and a cap 14 which is bolted against the end face 15 of each leg 16—17 of the wheel fork, as by means of cap screws 18, which clamps the axle against rotation or axial movement because of the flat 13 and shoulders 19 and 20. Therefore, to remove a wheel it is merely necessary to remove the cap screws 18, and if the trailer is lifted or jacked up, the wheel completely assembled with its axle will drop out, and it can as easily and conveniently be replaced. Changing of tires on trailer casters has always been a tedious and inconvenient job, but with this invention the change is as easily made as on any ordinary automobile wheel.

The legs 16 and 17 of the fork are rigidly connected near their upper ends by a cross-member 21 which simultaneously functions as a spring-tensioning member support and a bumper support, and is located in spaced relation to the upper ends of the fork to provide a short fork having arms 22 and 23 at the upper end for the pivotal attachment or rock shaft 24.

The pivotal connection for the caster consists of a cylindrical member 25 which is hollow as indicated at 26 to receive a pivot bolt 27 and has an annular flange 28 provided with an annular oil groove 29 formed in the top face of the flange, and another concentric oil groove 30 formed in the top of the cylindrical member, a suitable filler passage being provided as indicated at 31 for refilling the grooves.

This pivotal connection has an integral depending bracket 32 which has a bore for receiving the rocker shaft 24, and has a depending fork including arms 33 and 34 which in normal position provide ample clearance from the cross-member 21, and axially aligned bearings 35 are provided on the respective arms.

A spring cup 36 has a trunnion 37 at each end to rotatably fit in the bearings 35 which are capped as indicated at 38 to permit installation and removal of the cup, and this cup has an axial passage for the spring tensioning bolt 39.

A compression spring 40 is seated in the spring cup and maintained under compression by the nut 41 and spring cap 42, this nut being adjustable to vary the tension of the spring at will and is provided with suitable locking means as indicated at 43, and a rubber or other resilient bumper 44 is interposed between the cross-member 21 and the cup 36 to absorb rebounds.

It will be noted that the spring is supported on a pivotally supported cup so that the axis of the spring can follow the arcuate movement of the head of the bolt 39, thus always maintaining even distribution of tension within the spring.

The pivot cap 45 or other portion of the combined pivotal connection and step bearing for the trailer has a cylindrical bore to receive the cylindrical pivot portion 25 and includes a flange 46 providing the other member of the step bearing. This flange is counterbored as indicated at 47 to provide an overhanging collar 48 to exclude dust from the flat bearing between the cooperative bearing flanges, and the head of the cap has an axial bore for the bolt 27, and has a pair of oppositely disposed brackets 49 provided with axially aligned bolt holes 50.

The mounting bracket has a top base member 51 for bolting to the bottom 52 of the trailer 53 and a pair of depending bracket members 54 to span the inside of the brackets 49, and has bolt holes alignable with the bolt holes 50, the mounting bracket being attached by means of the bolts 55.

Thus the entire caster structure can be removed by removing the bolts 55 for replacement of the pivot members, the bumper and spring can be removed, replaced, or adjusted at will, the wheel can be removed and replaced without disturbing the bearing assembly, and the device will absorb road shocks and rebounds with the greatest efficiency.

I claim:

1. A trailer caster shock absorbing means comprising; a pivotal vertical bearing, and means for securing the bearing to a trailer; a depending bracket on said bearing and having a horizontal bearing intermediate its length and terminating in a fork, and a spring cup pivoted between the legs of said fork at the lower ends thereof; a wheel fork pivotally supported at its upper end by said horizontal bearing and having a cross member intermediate its length and a spring bolt passing through said cross member and axially through said spring cup with interposed resilient bumper between said cup and said cross member and a compression spring seated in said spring cup and secured under predetermined compression by said bolt, and pivotal wheel bearings at the lower ends of the legs of said wheel fork.

2. In a trailer caster having a wheel fork and a pivotal support, road-shock and rebound absorbing means comprising; a cross-member rigidly securing the legs of said wheel fork in spaced relation and having a central bolt aperture and located intermediate the length of said wheel fork; an anchoring fork depending from said pivotal support and in interposed relation to the legs of the wheel fork and having the upper end of said wheel fork pivotally supported intermediate the length thereof, and a spring cup pivotally supported between the terminal ends of the arms of said anchoring fork, and a resilient bumper element interposed between said cross-member and said spring cup and a compression spring seated on said spring cup, and a bolt passing through said bolt aperture, through an axial passage in said bumper, axially through said spring cup and said spring, and a nut for adjusting the tension of said spring.

TOLBERT HAMILTON.

REFERENCES CITED

The following references are of record in the file of this patent:

UNITED STATES PATENTS

| Number | Name | Date |
| --- | --- | --- |
| 904,270 | Lippy | Nov. 17, 1908 |
| 1,177,237 | Egan | Mar. 28, 1916 |
| 2,040,121 | Bowen | May 12, 1936 |
| 2,227,875 | Boden | Jan. 7, 1941 |
| 2,282,506 | Wachter | May 12, 1942 |